United States Patent [19]
Hyman

[11] 3,982,385
[45] Sept. 28, 1976

[54] STALK ROLLS FOR CORN HARVESTERS
[75] Inventor: Myles Hyman, Lancaster, Pa.
[73] Assignee: Sperry Rand Corporation, New Holland, Pa.
[22] Filed: July 3, 1975
[21] Appl. No.: 592,964

[52] U.S. Cl. .................................. 56/106; 130/5 D
[51] Int. Cl.² ......................................... A01D 45/02
[58] Field of Search..... 56/119, 14.2, 103, 104–118; 130/5, 6

[56] References Cited
UNITED STATES PATENTS

| | | | |
|---|---|---|---|
| 3,001,527 | 9/1961 | Jones | 130/5 C |
| 3,100,491 | 8/1963 | Dillon | 130/5 C |
| 3,101,579 | 8/1963 | Karlsson et al. | 56/105 |
| 3,126,688 | 3/1964 | Karlsson | 56/13.3 |
| 3,499,272 | 3/1970 | Looker | 56/14.2 |
| 3,707,833 | 1/1973 | Sutton | 56/104 |
| 3,858,384 | 1/1975 | Maiste et al. | 56/14.2 |

Primary Examiner—Russell R. Kinsey
Attorney, Agent, or Firm—C. Hercus Just; Frank A. Seemar; John R. Flanagan

[57] ABSTRACT

A corn harvester header attachable to a forage harvester and provided with a plurality of shield units spaced apart to form passage ways to receive corn stalks and including endless flexible means respectively on each side of said passage to positively feed corn stalks along said passage relative to a narrow slot formed by opposed stripping members which accommodate the stalks but prevent the ears from passing therethrough, and a pair of stalk rolls extending longitudinally below said slot at opposite sides thereof and rotated in opposite directions in a manner to pull said stalk, downward through said slot and thereby strip the ears from said stalk. The present invention concerns the shape of elongated flutes which are attached to the stalk rolls for improved engagement of the stalks thereby.

6 Claims, 6 Drawing Figures

STALK ROLLS FOR CORN HARVESTERS

BACKGROUND OF THE INVENTION

Corn harvester headers employing stalk rolls used in separating the ears from corn stalks have been employed in a number of different types of harvester headers heretofore. Representative of such previous devices are the machines described and claimed in the following patents.

| 3,101,579 | Karlsson et al | Aug. 27, 1963 |
| 3,126,688 | Karlsson | March 31, 1964 |
| 3,499,272 | Looker | March 10, 1970 |
| 3,648,443 | Sears | March 14, 1972 |

As will be seen from the foregoing patents, the rolls employed in the header constructions each include a plurality of blades or flutes which either extend radially from the axis of the rolls or somewhat tangentially therefrom, whereby it is only the outer edges of said blades or flutes which engage opposing sides of the corn stalks which move through slots or passages that extend longitudinally within the header, in the direction of movement thereof while harvesting the crops. In said devices, it is common practice for purposes of increasing the movement of the stalks incident to having the ears snapped or forcibly pulled therefrom to add cut-off blades adjacent the rear ends of the rolls to insure a final separation or pinching action of the ears from the stalks. Such an arrangement in said prior devices also result in substantial stalk breakage and thereby minimizes the efficiency of the machines. Further, it is preferred practice in the operation of corn harvesters of this type to leave the stalks in somewhat standing condition in the fields after stripping the ears therefrom, whereby additional machines may harvest the stalks and chop or cut them into condition for being used as silage and stored in a silo or otherwise handled for desired purposes.

SUMMARY OF THE INVENTION

It is the principal purpose of the present invention to provide an improved form of flute, a plurality of which are preferably detachably connected to the roll members in a row crop corn harvester header, such header, for example, being of the type shown and described in prior U.S. Pat. No. 3,765,157, in the name of Hyman et al., dated Oct. 16, 1973. However, the improved flutes may be utilized in other harvester headers to improved advantage.

It is another object of the invention to form said improved flutes with longitudinally extending rib projecting from one surface of each flute, substantially intermediately between the opposite side edge portions thereof, and said rolls having a geometric configuration in cross section, preferably square, to provide longitudinally extending faces at right angles to each other to which one edge portion of each flute is connected in a manner to dispose the opposite edge portions substantially tangential to the axis of the rolls and the ribs on said flutes extending outward, whereby when a pair of said rolls are rotated respectively in opposite directions to engage a corn stalk, the outermost edges of the outer edge portion of a flute on one roll will be indexed to co-act relative to the outer surface of the rib on a flute on the opposite roll and the space between said co-acting portions of the respective flutes will be substantially less than the diameter of a corn stalk so as to move the stalk downward relative to a stripping slot in the header with a more effective gripping action but subjecting the stalk to less breakage and damage than has resulted in using conventional type flutes on stalk rolls.

It is a further object of the invention to employ transverse dimensions in said aforementioned rolls and flutes so as to dispose the outermost edges of the outer edge portions of successive flutes on a stalk roll substantially within a plane within which the outer surface of the rib of one of said flutes is disposed, whereby when said pair of successive flutes on one roll co-act with the outermost edge of the outer edge portion of a flute on the opposite roll, the stalk will be engaged at threee locations by the flutes on the first mentioned roll incident to being firmly engaged between the rib on said roll and the outermost edge of one of the flutes on the opposite roll, thereby effecting even greater positive engagement of the stalk by the flutes of said rolls than if said arrangement of the flutes on said rolls were not as indicated.

Still another object of the invention is to attach one of the edge portions of the improved flutes flatly against the faces of the roll and secure the same thereto by bolts extending through a longitudinally spaced series of holes in both the one edge portion of said flutes and the roll, said bolts preferably extending entirely through the roll and being received in aligned holes in an opposing pair of flutes, thereby minimizing attaching means.

Ancillary to the foregoing object, it is still another object to form the holes in said one edge portion of each flute in the form of a longitudinally spaced pairs of holes, each pair of holes being spaced longitudinally a shorter distance than the space between successive pairs thereof, whereby corresponding holes of two of said flutes which are respectively disposed on opposite surfaces of the roll may have bolts extended through said holes to connect said opposing pair of flutes to the roll, while the other hole of each pair is employed in a second pair of said flutes to be connected to the transversely disposed pair of flat surfaces on the roll and receive bolts therethrough to fimly attach the second pair of flutes to the roll and, to permit such connection, said rolls are provided with longitudinally spaced pairs of holes complementary to the spacing of the holes in said flutes but, in the rolls, the holes of each pair thereof respectively are at a right angle to each other.

Details of the foregoing objects and of the invention, as well as other objects thereof, are set forth in the following specification and illustrated in the accompanying drawings comprising a part thereof.

DETAILED DESCRIPTION

Figure 1:
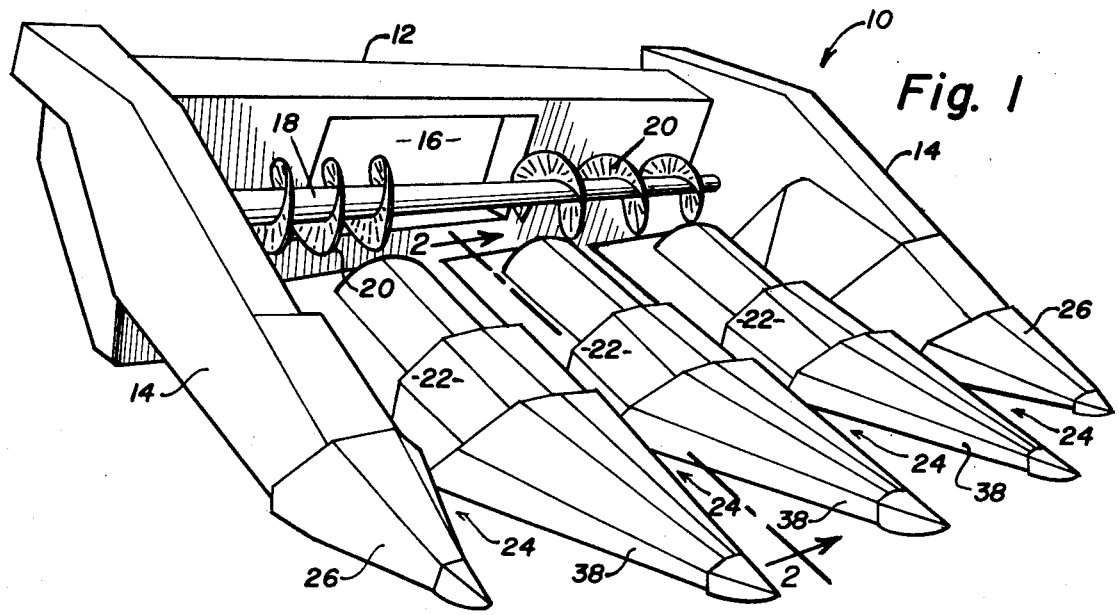
FIG. 1 is a perspective view of an exemplary row crop corn harvester header of the type to which the present invention pertains.

Referring to FIG. 1, the header 10 is comprised of a base frame member 12 and opposing side members 14 respectively are connected to opposite ends of the base frame 12 in conventional manner. Base frame member 12 also has an opening 16 through which crop material, such as ears of corn, or otherwise, is passed for delivery to appropriate elevating means or otherwise which move the separated material to apparatus for further processing. An auger 18 extends between the side members 14 and, on opposite ends portions thereof, has reversely spiralling flights 20 thereon, the auger 18 being rotated in a direction to effect consolidation of the crop material for passage through the opening 16.

The header 10 also is provided with a plurality of sectional type shields 22 which are similar to each other and enclose mechanism described in detail hereinafter by which corn stalks are positively moved along longitudinal passages 24 between the side edges of adjacent shields 22. Further, the side members 14 terminate forwardly in partial shields 26, the inner edges of which define one side of additional longitudinal passages 24 in conjunction with the next adjacent shields 22. For additional details of said shield construction, attention is directed to prior U.S. Pat. No. 3,765,157 referred to above in view of the fact that said shields per se comprise no novel part of the present invention.

Figure 2:
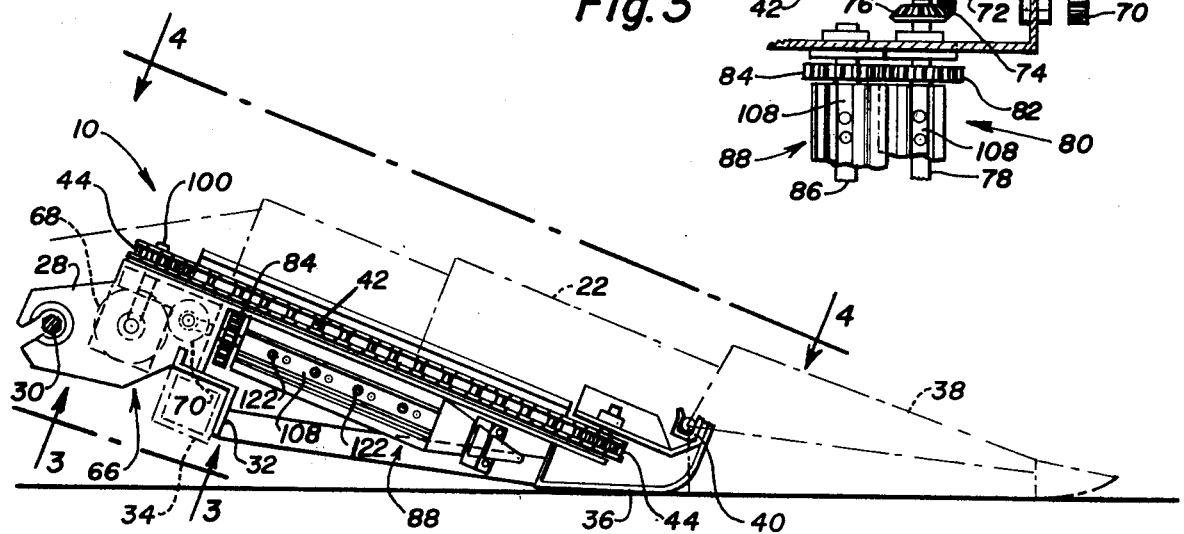
FIG. 2 is a fragmentary vertical section of a portion of the header shown in FIG. 1 as seen along the line 2—2 thereof.
Figure 4:
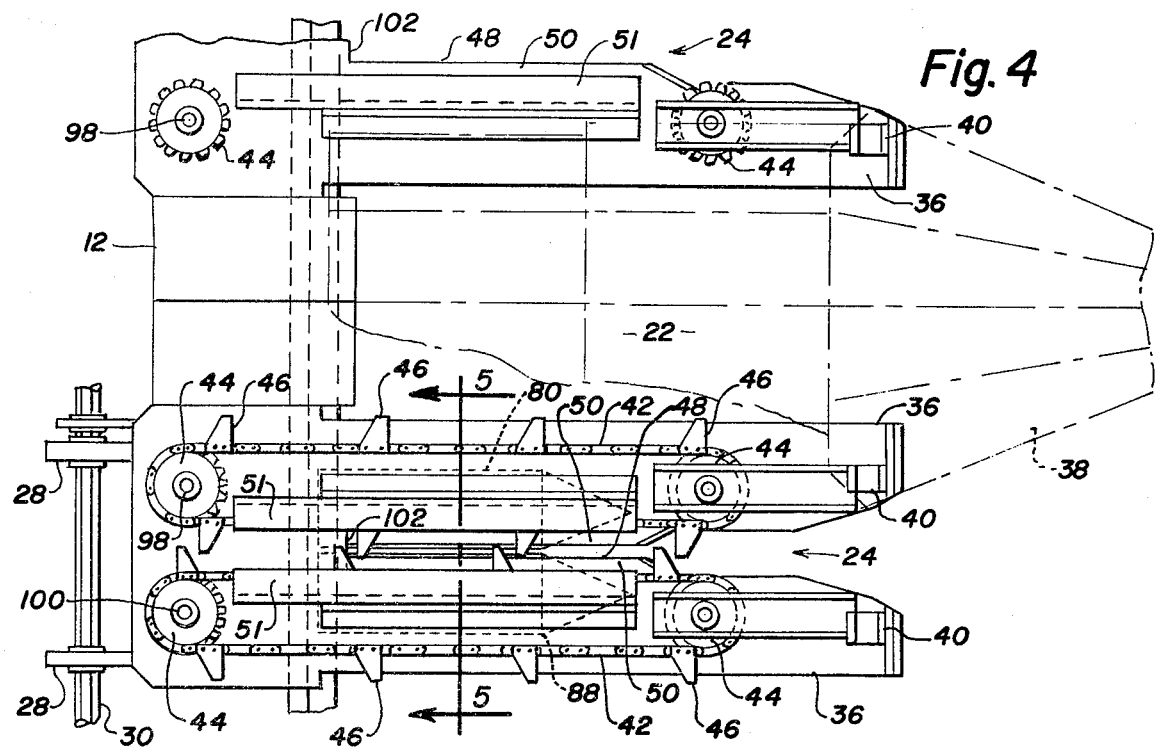
FIG. 4 is a fragmentary top plan view of a section of the header shown in the preceding figure in which the shield shown therein has been illustrated in phantom for purposes of simplifying the illustration in which a pair of stalk rolls and propelling endless chain means are shown in operative relationship and portions of a similar arrangement are fragmentarily illustrated in the upper part of the figure.

Referring to FIG. 2, it will be seen that the header 10 is provided with a series of similar rearwardly extending plates 28 having openings through which a drive shaft 30 extends. Also, at opposite sides thereof, the header is provided with a supporting channel member 32, best shown in FIG. 2, which engages a transverse member 34, shown in phantom, which is connected to one of a pair of forwardly extending arms on the forage or corn harvester to which the header 10 is to be connected. Said arms are not illustrated but are of conventional type in the harvesters referred to. The forward end of each of the mechanical units disposed in the shields 22 and 26 are provided with guide shoes 36 which are slidably engagable with the surface of a field containing the crops to be harvested. The forward shield portion 38 of each of the shield units 22 and 26 is pivotally connected at its rearward end to a yoke 40 attached to the guide shoes 36, as best shown in FIGS. 2 and 4, whereby the nose portions at the forward ends of the forward shield portions 38 are yieldable in accordance with the surface of the field over which they move.

As the harvester header 10 is moved along a field, such as one in which rows of stalk crops such as corn are growing and harvesting the same is to be undertaken, the shield members 22 are adjusting transversely in accordance with the details, not shown, but illustrated and described in said aforementioned U.S. Pat. No. 3,765,157, in order to arrange the elongated passages 24 in suitable position to correspond to the spacing of the rows of the corn crop or otherwise. Hence, as the header moves along the rows of corn stalks, for example, said stalks individually are received in sequence in the passages 24. To insure that the stalks will move along said passages, there is an endless flexible member comprising a sprocket chain 42 on each side of the passages 24, said chains being supported by sprocket gears 44 respectively supported upon axes perpendicular to the chains 42 relative to certain extensions of the frame 12 of the header. The chains 42 are so mounted that a span of each of the chains which is nearest the passage 24 is parallel thereto and said chains each support a series of stalk-engaging lugs 46, the lugs on said chains being arranged so that lugs on the opposite chains respectively are adjacent each other to engage the stalks and push them along the passages 24 and also push them through a narrow slot 48, which is best shown in FIG. 5, and is defined by the inner edges of a pair of straight members 50 which, specifically, comprise plates supported immediately below the chains 42.

Also mounted above the plane of straight members 50 are inwardly extending flanges 51, the inner edges of which are parallel to each other and to the edges of members 50 which define slot 48 and are spaced apart a distance less than the thickness of stalks 52 and 54 so as to effect an initial separation of the ears 54 from stalks 52. If such separation does not occur, however, the slot 48 positively insures such separation.

Figure 5:
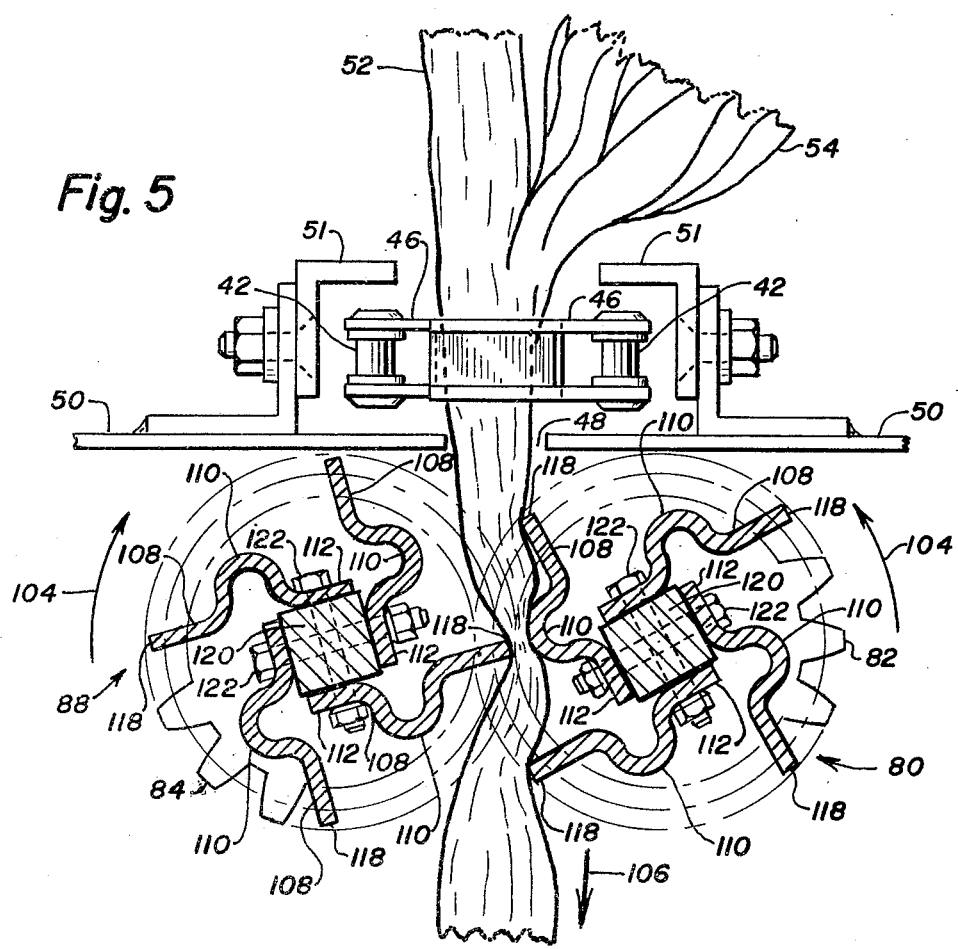
FIG. 5 is a substantially enlarged, fragmentary transverse sectional view showing details of the improved stalk rolls and flutes illustrated in operative relationship relative to a corn stalk, as seen along the line 5—5 of FIG. 4.

As also best shown in FIG. 5, it will be seen that the corn stalk 52 has an ear 54 extending therefrom and is in process of being pulled down to the slot 48. The width of the slot 48 is substantially equal to or only slightly wider than the diameter of the stalk 52, whereby the ear 54 cannot pass through the slot 54 due to the greater diameter of the ear than the stalk, said ear being only fragmentarily shown.

Figure 3:
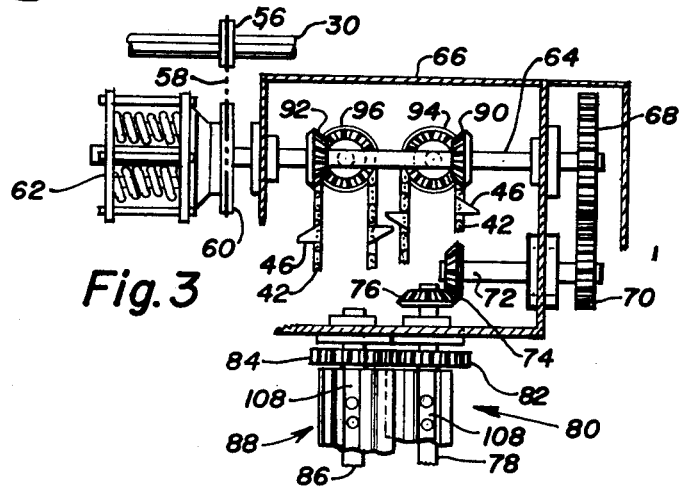
FIG. 3 is a fragmentary bottom plan view taken from the underside of a portion of the header illustrated in FIG. 2, as seen on the line 3—3 thereof.

The drive mechanism for the chains 42 is best shown in FIGS. 2 and 3, details of which are as follows. It will be understood that the drive shaft 30 is driven by a suitable power connection directly to the prime mover, not shown, of the corn harvester or other type of forage harvester to which the header 10 may be connected. Said shaft 30 is shown fragmentarily in FIG. 3 and the same has a sprocket gear 56 connected thereto and, through a sprocket chain 58, the sprocket gear 58 drives another larger diameter sprocket gear 60 which, through a slip-clutch unit 62, drives a shaft 64 which is within a housing 66, shown in FIG. 2, that is adjacent the inner ends of the several units within the shields 22. The end of shaft 64 opposite the slip clutch 62 is fixed to a large spur gear 68 and this meshes with and drives a driven spur gear 70 of smaller diameter than gear 68, the gear 70 being connected to one end of a stub shaft 72, the outer end of which is fixed to a bevel gear 74 which meshes with another bevel gear 76 that is fixed to one end of a shaft 78 upon which one of the stalk rolls 80 is mounted and to which it is fixed for rotation thereby. The shaft 78 also has a spur gear 82 connected thereto which meshes with another spur gear 84 that is connected to a second shaft 86 upon which a second stalk roll 88 is mounted and to which it is fixed for rotation thereby.

There is also fixedly connected to shaft 64 a pair of similar spur gears 90 and 92 which mesh with spur gears 94 and 96 of similar diameter to spur gears 90 and 92 respectively, the spur gears 94 and 96 being fixed to short shafts 98 and 100 to which the sprocket gears 44 are connected, as shown in FIG. 4. Due to the arrangement of the spur gears 90 and 92 upon the shaft 64, it will be seen that the same mesh respectively with spur gears 94 and 96 in a manner to drive the adjacent parallel spans of the sprocket chains 42 in the same direction which is inward from the outer ends of the longitudinal passages 24, toward the inner ends therein, said passages being intersected by a transverse edge 102 formed on the inner ends of the straight members 50 which define the inner ends of the longitudinal passages 24.

From the foregoing, it will be seen that the endless flexible members 42 which comprise sprocket chains are driven by the same power means that rotate the shafts 78 and 86 and, correspondingly, the stalk rolls 80 and 88, the latter being rotated in opposite rotary direction as indicated by the directional arrows 104 in FIG. 5 for purposes of pulling the stalk 52 downward in the direction of the directional arrow 106 shown in FIG. 5 in a manner to strip or pop off the ear 54 from the stalk 52 as the butt end of the ear 54 reaches the narrow slot 49.

Figure 6:
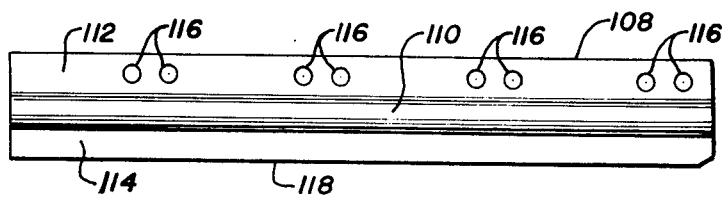
FIG. 6 is a plan view of an improved flute for a stalk roll which embodies the principles of the present invention.

The principal feature of the present invention comprises details of the flutes 108, the cross sectional shape of which is best shown in FIG. 5 and the same also being shown in plan view in FIG. 6. The function and operation of the improved flutes 108 is best illustrated in FIG. 5, the description of which is as follows. The improved flutes 108 preferably are formed from sheet metal and by suitable stamping or rolling operation, the same are provided with a substantially central rounded rib 110 which, in addition to providing stiffening for the flutes 108 also, even more importantly, provide a gripping function for the stalks 52, described in detail hereinafter.

The ribs 110 also are provided with opposite outer edge portions 112 and 114. The portions 112 are provided with a series of pairs of holes 116 which are for purposes to be described. The opposite outer edge portion 114 of each of the flutes 108 has a gripping outer edge 118 which also is for purposes to be described, as follows.

Referring to FIG. 5, it will be seen in regard to stalk roll 80, which is at the right hand side of FIG. 5, at the left side thereof as illustrated in said figure, the gripping outer edges 118 of two successive flutes 108 are substantially within the same plane as the outer crest of the central rounded rib 110 of one of said flutes. This is of significant advantage with respect to gripping the stalk 52 particularly in one indexed relationship of the flutes 108 on the opposite stalk rolls 80 and 88 which respectively are carried by the mechanism within the shields 22 respectively on opposite sides of the longitudinal passages 24, said relationship being illustrated in FIG. 5. In said figure, it will be seen that the gripping outer edge 118 of the stalk roll 88 is in gripping opposition to the outer crest of the central rounded rib 110 of the flute 108 which is connected to the stalk roll 80. The distance between said crest of the rib 110 and the outer edge 118 of said flute 108 is less than the diameter of the stalk 82, whereby the stalk will be somewhat pinched between the opposing surfaces referred to above to a sufficient extent to effectively grip the stalk and pull the same downwardly in the direction of the arrow 106 and thereby cause the ear 54 to be forceably separated from the stalk 52 when the butt end of the ear 54 reaches the narrow slot 48. Also, as further illustrated in FIG. 5, the particular incidence of the coaction of the two stalk rolls and the flutes thereon as illustrated in said figure, additional gripping of the stalk 52 is effected by virtue of the gripping outer edges 118 engaging the left hand side of the stalk 52 in addition to the pinching action effected by the outer surface of rib 110 of the stalk roll 80 and the outer edge 118 of the particular flute 108 of stalk roll 88 which engages the opposite side of stalk 52. This results in further gripping of the stalk 52 and the overall gripping described immediately above will recur cyclically each time one of the outer edges 118 of the left hand stalk roll 88 is brought into incidence with the outer surface of the rounded rib 110 of a flute 108 on the right hand stalk roll 80 and the same also occurs between rib 110 of the left hand stalk roll and the outer edges 118 of the right hand stalk roll.

It has been found from actual operation that the gripping imparted to the stalk 52 by the rib 110 and gripping outer edge 118 of each of the improved flutes 108 of the present invention provides far more effective gripping of the stalks 108 of corn and the like for purposes of pulling the same downwardly as the lugs 46 on the flexible endless members 42 move the stalk longitudinally within the passages 24 and the narrow slots 48 than is capable of being performed by the relative straight and flat radial and tangential flutes of the current corn and forage harvesters and especially such as illustrated in the aforementioned U.S. patents to Karlsson et al., Karlsson, Looker and Sears. This is due to the fact that the forceable removal of the ears 54 from the stalks 52 by the above-described mechanism and function thereof is sufficiently reliable that it is generally unnecessary for the ears to engage the transverse edges 102 which are disposed at the inner ends of the passages 24, whereas in the previous and currently employed ear separating mechanism associated with stalk rolls of the existing corn harvesters and the like, it is substantially essential that transverse cut-off members be employed to insure complete separation of the ears from the stalks handled by said mechanism. A further improvement and benefit afforded by the present invention however comprises the fact that at least in general, the stalks are subjected to wedging and bending to only a limited degree and this results in reducing the amount of stalk breakage such as occurs in using current and previous stalk rolls in corn harvesters and the like.

A further aspect of the present invention comprises the relatively simple but highly effective mechanism by which the flutes 108 are attached to the central or basic member 120 of the stalk rolls 80 and 88. As clearly shown in FIG. 5, it will be seen that the preferred configuration of the same in cross section, is square, thus providing four relatively flat faces which extend longitudinally along said roll for purposes of having the outer edge portions 112 firmly connected respectively to said surfaces by a series of bolts 122 which extend through one of each of the pairs of holes 116 formed in the outer edge portions 112 of each of the flutes 108. Also, the central member 120 of the rolls 80 and 88 is provided with a longitudinally spaced series of pairs of holes which are spaced correspondingly to the holes 116 along the outer edge portion 112 of the flutes 108. However, in regard to the holes in the central member 120 of each of said rolls, the holes of each pair thereof respectively are disposed at right angles to each other as can be clearly seen from FIG. 5. Accordingly, when the bolts 122 extend through one of the holes 116 of each pair thereof, one opposing pair of the flutes 108 are firmly connected to the central member 120 of each of the rolls, whereas when a bolt 122 is extended through the other hole 116 of each pair thereof, a second pair of the flutes 108 are connected firmly to the central member 120 of each of the rolls, thus minimizing the amount of bolts necessary to connect the flutes to the central members 120 of the rolls 80 and 88.

From the foregoing, it will be seen that the present invention provides an improved means for gripping the stalks 52 to separate ears 54 therefrom in a manner which results in less stalk damage or breakage and, further, improved positive movement of the stalks is accomplished to minimize the necessity of relying upon the transverse edges 102 at the inner ends of passages 24 to effect removal of ears from the stalks.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. In a row crop corn harvester header attachable to a forage harvester and including a plurality of shield units spaced transversely apart to provide an elongated passage therebetween to receive corn stalks for the removal of ears therefrom by said header, each unit having a straight member extending longitudinally along one side of each passage and having an edge coacting with an edge on the straight member on the adjacent unit to define a narrow stripping slot through which corn stalks can pass but not the ears, endless flexible members having lugs spaced therealong and supported for movement of an elongated span thereof along one side of said elongated passage adjacent and substantially parallel to said edge of said straight member on said unit, means to drive said endless flexible members to move said elongated spans thereof on opposite sides of said passage in similar directions to positively move corn stalks along said passage and narrow slot, stalk rolls carried by each unit adjacent said passage in substantially parallel relation to and beneath said straight members, and means to rotatably drive said rolls on opposite sides of said passage in opposite rotary directions to engage corn stalks in said passage and pull them downward as the lugs on said endless flexible members move them along said slot, thereby to cause the ears to engage the edges of said slot between said straight members and be separated from said stalks as they are pulled downward by said stalk rolls; the improvement comprising each stalk roll having a plurality of elongated flutes connected in circumferentially spaced relationship around the axes of each stalk roll, said flutes being similar and each including a rib extending outwardly from one surface of said flute and the opposite edge portions being within a common plane, means connecting one of said edge portions of each flute to said roll at evenly spaced circumferential positions and extending substantially tangentially from said roll, whereby said ribs extend outwardly from the edge portion of the next adjacent flute on said roll, and bearing means supporting the opposite ends of said rolls in positions to dispose the axes of adjacent rolls in suitable positions to enable the outermost edges of the outer edge portions of said flutes on one roll to be suquentially spaced from the ribs on the other roll a distance appreciably less than the diameter of corn stalks engaged thereby, and means to index said rolls to effect such sequential relation of successive outer edges and ribs of said flutes as said rolls are rotated.

2. The harvester header according to claim 1 in which the outermost edges of successive flutes are substantially within a plane with the rib of one of said flutes, whereby one roll engages a corn stalk at three locations simultaneously while the opposite side of said stalk is engaged by the outermost edge of one flute on the other roll to press said stalk against the rib of the flute on said first-mentioned roll.

3. The harvester header according to claim 1 in which said rolls have a geometric shape in cross section and each face has one edge portion of a flute connected thereto.

4. The harvester header according to claim 3 in which said geometric shape is a square and four flutes are attached to each roll, one edge portion of one of said flutes being attached to each face of said rolls.

5. The harvester header according to claim 4 in which said edge portion of each flute is provided with a series of holes and said rolls having a similar series of holes spaced longitudinally therealong for alignment with the holes in said flutes when the latter are disposed against said rolls, and bolts extending through said holes on said flutes and rolls when the holes thereon are aligned as aforesaid to detachably connect said flutes to said rolls.

6. The harvester header according to claim 5 in which said holes in said one edge portion of each flute comprise pairs of longitudinally spaced holes and a series of said pairs of holes being formed in said one edge portion of each flute in positions which are spaced apart longitudinally a greater distance than the distance between each pair of said holes, and said holes in said rolls also comprising a plurality of pairs of said holes spaced similarly in longitudinal direction to said pairs of holes on said one edge portion of each flute but the holes of each pair in said rolls respectively being disposed at 90° to each other, and said connecting bolts extending between two opposed outer edge portions of said flutes respectively on opposite faces of said rolls and the transversely disposed hole of each pair of said holes in said rolls being arranged to receive bolts extending therethrough and the holes in said outer edge portions of a second pair of said flutes, the longitudinal spacing between each pair of holes in said flutes and rolls being spaced longitudinally apart a sufficient distance to prevent conflict between said bolts, thereby minimizing the number of bolts required to attached four flutes respectively to the four faces of each square roll.

* * * * *